United States Patent [19]
Eash

[11] 3,805,970
[45] Apr. 23, 1974

[54] CHANGER APPARATUS

[76] Inventor: George H. Eash, 3546 Aliginet Dr., Los Angeles, Calif.

[22] Filed: Feb. 24, 1970

[21] Appl. No.: 13,385

[52] U.S. Cl. ...................... 214/6 D, 40/79, 274/4 F, 353/116, 214/8.5 F
[51] Int. Cl. ............................................. B65g 60/00
[58] Field of Search .......... 214/6 D, 6 F, 6 BA, 6 R, 214/8.5 F; 274/4 F; 40/79, 36; 353/114, 115, 116, 92

[56] References Cited
UNITED STATES PATENTS

| | | | |
|---|---|---|---|
| 3,603,597 | 9/1971 | Haake | 274/4 F |
| 2,653,512 | 9/1953 | Brock | 40/36 |
| 3,477,726 | 11/1969 | Laschenski | 274/4 F |
| 3,010,233 | 11/1961 | Wells et al. | 40/36 |
| 3,620,385 | 11/1971 | Vermeijlen et al. | 214/6 D |
| 3,411,227 | 11/1968 | Sobotta | 40/79 X |

FOREIGN PATENTS OR APPLICATIONS

| | | | |
|---|---|---|---|
| 64,587 | 11/1968 | Germany | 353/114 |
| 373,884 | 5/1923 | Germany | 40/36 |
| 373,885 | 5/1923 | Germany | 40/36 |

*Primary Examiner*—Robert J. Spar
*Attorney, Agent, or Firm*—Kendrick & Subkow

[57] ABSTRACT

An improved apparatus for selectively moving an object (e.g., a photographic slide or a magnetic tape cartridge) from one end of a stack of such objects in a storage chamber to a using station (e.g., viewing or playback station), and thereafter replacing the object at the opposite end of the stack in the storage chamber. The apparatus includes a housing having an object storage chamber, an object using chamber, a pair of inclined ramps extending between the storage chamber and the using chamber, and an object changer mechanism slideably mounted in the housing. The changer mechanism includes a slide plate having a pair of fingers on the forward end thereof for engaging the forward edge of an object at one end of the stack in the storage chamber and moving that object past the ramps to the object using station. A pusher member is mounted on the slide plate for pushing the object in the using chamber along the ramps to the opposite end of the stack after the object has been used (e.g., viewed or played). The ramps are pivotably mounted in the housing to permit the ends thereof to swing out of the way of an object being moved from the storage chamber to the using station. In the preferred embodiments, wherein the objects are stored in vertical stacks, lifter arms, slideably mounted in the pusher members, are provided for engaging the rear edges of the objects being pushed up the ramps to maintain the objects in generally horizontal attitudes.

2 Claims, 11 Drawing Figures

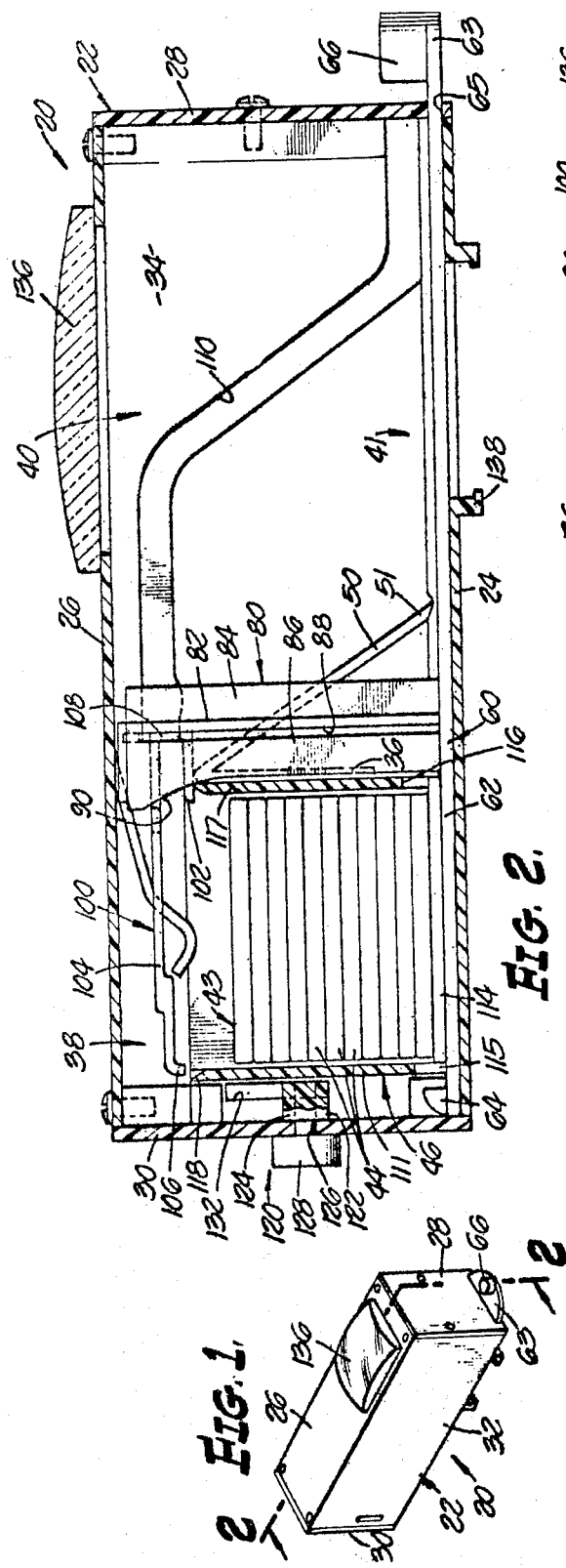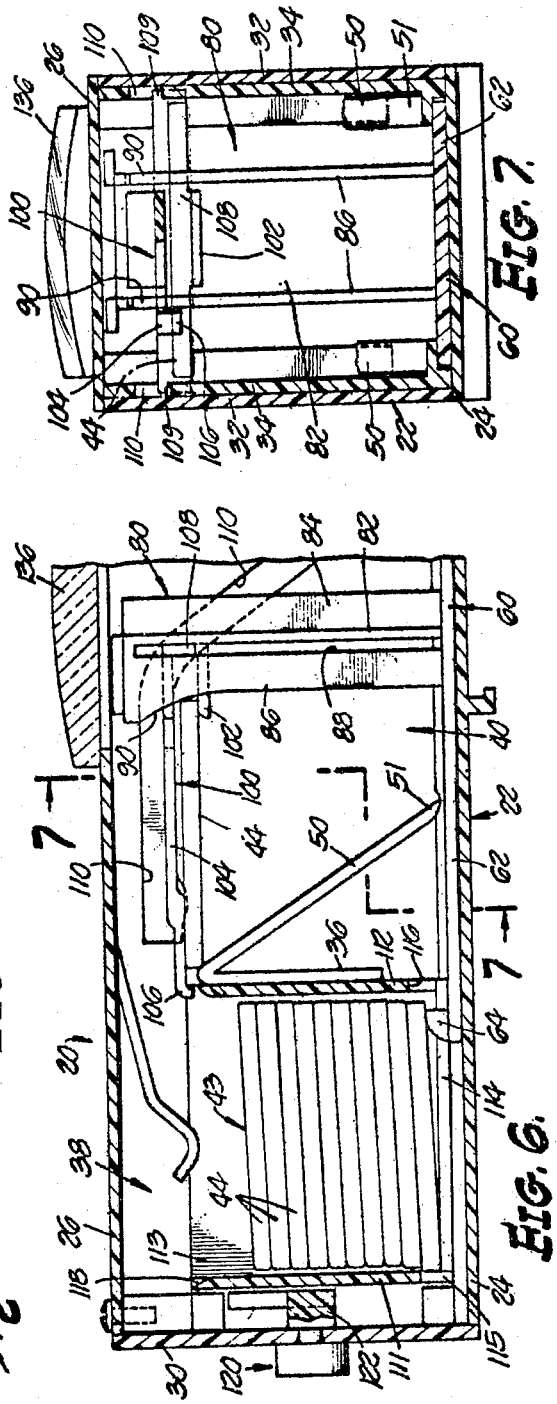

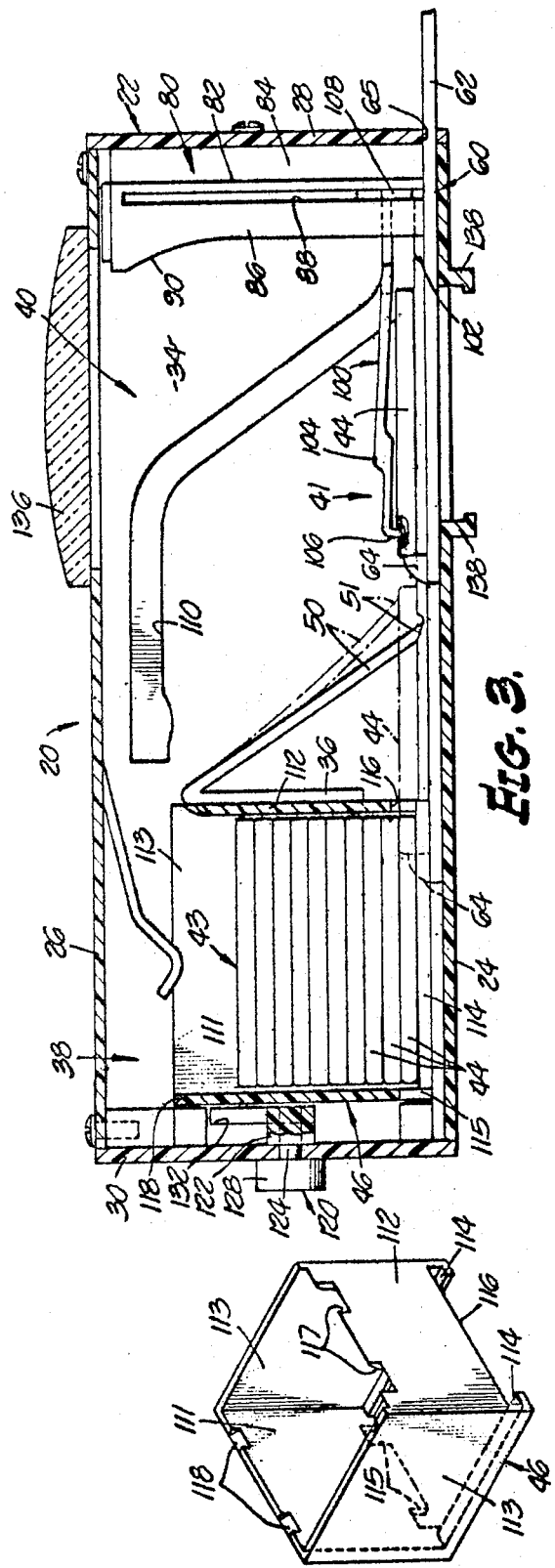

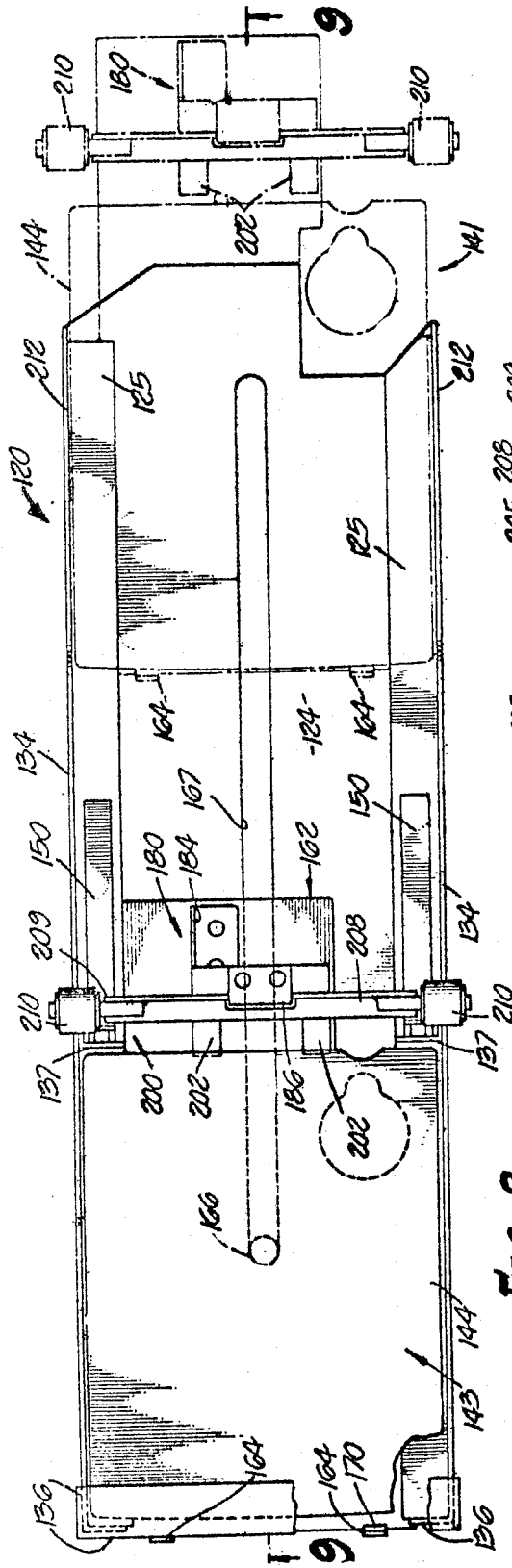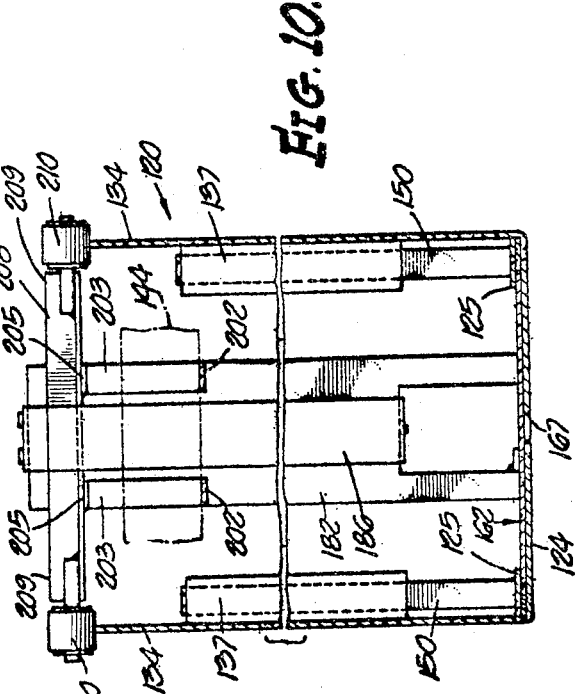

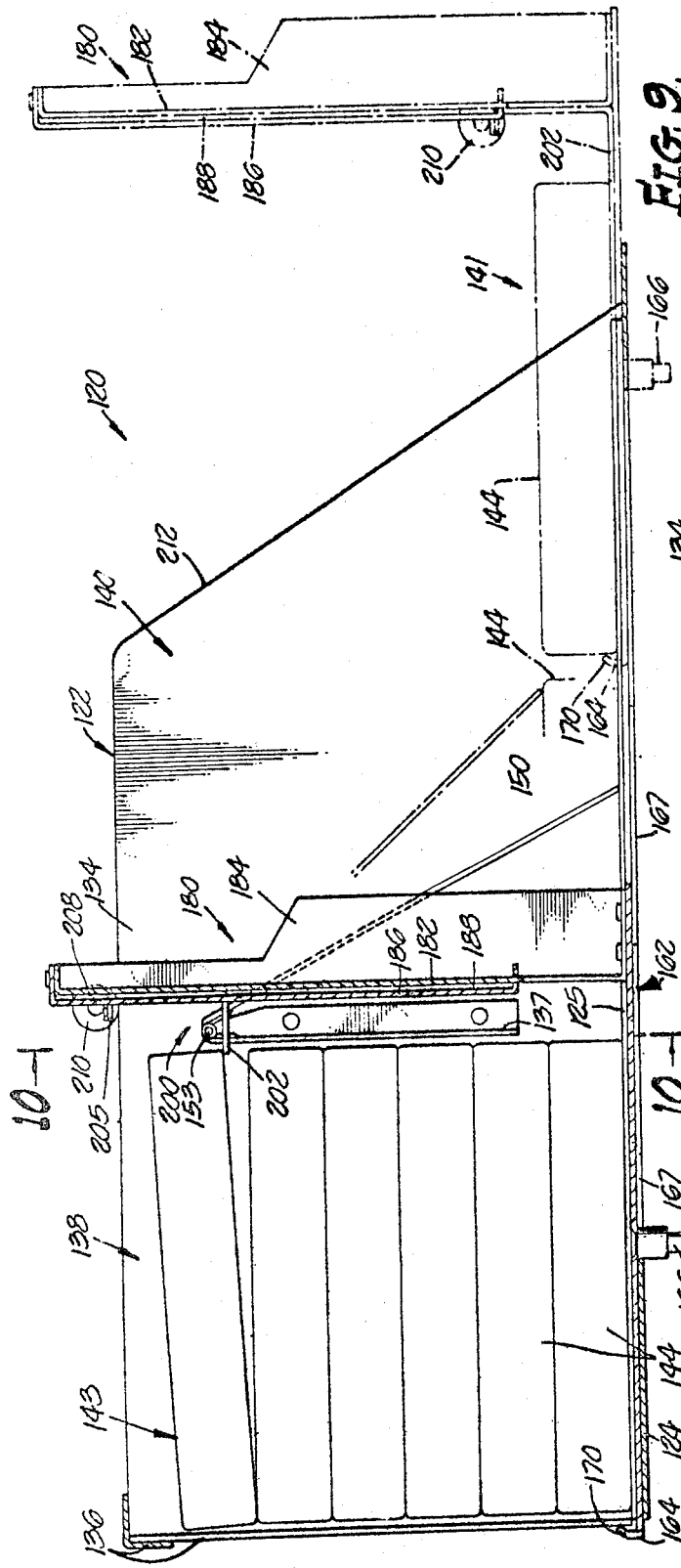
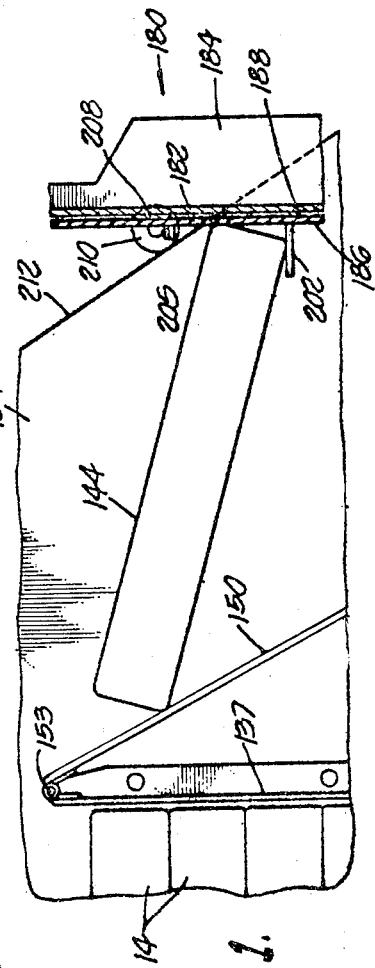

CHANGER APPARATUS

BRIEF DESCRIPTION OF THE DRAWINGS

FIG. 1 is a perspective view of a photographic slide viewer and changer embodying the concepts of the present invention;

FIG. 2 is a sectional side elevation view of the apparatus of FIG. 1, taken along the line 2—2 thereof, showing the slide changer mechanism in the forward position;

FIG. 3 is a sectional side elevation view similar to FIG. 2, showing the changer mechanism in the rear position;

FIG. 4 is a top plan view, partly in section, of the apparatus as shown in FIG. 3;

FIG. 5 is a perspective view of a slide storage receptacle adapted for use in the apparatus shown in FIGS. 1 – 4;

FIG. 6 is a sectional side elevation view of the forward portion of the apparatus shown in FIGS. 1 – 4, with the changer mechanism occupying an intermediate position, between the forward and rear positions;

FIG. 7 is a sectional end elevation view taken along the line 7 — 7 of FIG. 6;

FIG. 8 is a top plan view of a magnetic tape cartridge changer embodying the concepts of the present invention;

FIG. 9 is a sectional side elevation view of the apparatus shown in FIG. 8 taken along the line 9 — 9 of FIG. 8;

FIG. 10 is a sectional and elevation view taken along the line 10 — 10 of FIG. 9; and FIG. 11 is a partial side elevation view of the apparatus shown in FIGS. 8 – 10, showing the changer mechanism as it is returning a cartridge to the top of the stack after it has been played.

DETAILED DESCRIPTION OF PREFERRED EMBODIMENTS

Slide Viewer and Changer

FIGS. 1 – 7 of the drawings illustrate an improved photographic slide viewer and changer 20. The apparatus 20 includes a housing 22 having a bottom wall 24, a top wall 26, a rear end wall 28, a removable front end wall 30, spaced, outer side walls 32, 32 and spaced, inner side walls 34, 34. A pair of spaced partition strips 36, 36 secured to the inner side walls 34, 34 divide the interior of the housing 22 into a slide storage compartment 38 and a slide viewing compartment 40 having a slide viewing station 41.

The slide storage compartment 38 is adapted to hold a stack 43 of slides 44, 44 . . . 44. A slide storage receptacle 46 (best shown in FIG. 5) is provided for retaining the slides 44 in a neat stack. The receptacle is particularly designed for use in the apparatus 20, as described in detail hereinafter.

A pair of spaced, inclined ramps 50, 50 are secured at their upper ends to the partitions 36, 36. The ramps 50, 50 extend from the upper portion of the slide storage compartment 38 to the lower portion of the slide viewing compartment 40 for guiding movement of a slide from the viewing station 41 to the top of the stack of slides 44 in the storage compartment. The ramps are preferably constructed of a flexible material, such as plastic, so that the bottom portions 51, 51 thereof may swing upwardly (phantom line position in FIG. 3) to permit the passage of a slide 44 therebeneath. Alternatively, the upper ends of the ramps may be hinged, as in the cartridge changer embodiment of FIGS. 8 – 11 described below.

A slide changer mechanism 60 is provided in the housing 22 for selectively moving the lowermost slide 44 in the stack 43 from the storage compartment 38 to the viewing compartment 40 and thereafter replacing the slide on top of the stack 43 by pushing it up the ramps 50, 50. The changer mechanism 60 includes a generally flat, elongated slide plate 62 slideably mounted on the bottom wall 24 of the housing 22. A pair of spaced, slide engaging fingers 64, 64 are provided on the forward end of the slide plate 62 for camming the stack of slides 44 upwardly when the slide plate 62 is moved forwardly, as shown in FIG. 6. The rear end 63 of the slide plate extends through a transverse slot 64 in the rear housing wall 28 and has a handle or knob 66 mounted thereon.

An upstanding pusher member 80 is mounted on an intermediate portion of the slide plate 62 for pushing slides 44 up the ramps 50, 50. The pusher member 80 includes an upstanding flat mounting plate 82 extending substantially parallel to the front and rear housing walls 30, 28, and an upstanding brace plate 84 extending substantially perpendicular to the mounting plate on the rear surface thereof. A pair of spaced pusher arms 86, 86 are secured to the forward surface of the base plate 82, with a vertical slot 88 provided between each pusher arm and the mounting plate 82. The upper front edge portion of each pusher arm 86 is curved forwardly, as shown at 90.

A slide lifting device 100 is mounted in the pusher member 80 for vertical sliding movement relative thereto. The retaining device includes a relatively short bottom arm or ledge 102 adapted to engage the lower rear edge of a slide 44 to be replaced on the top of the stack in the storage compartment 38, and a pair of substantially parallel, longer upper arms 104, 104 adapted to overlie the upper surface of the slide to be replaced. The forward ends 106 of the upper arms are bent downwardly to limit forward movement of the slide 44 being replaced, as described more fully hereinafter.

The rear edges of the arms 102, 104, 104 are secured to a transverse plate 108 having outer edges 109, 109 which extend through the vertical slots 88, 88 in the pusher arms 86, 86 and into guide slots 110, 110 provided in the inner side walls 34, 34 of the housing 22.

It will be noted that the slide retaining receptacle 46 is designed to accommodate the slide engaging fingers 64, 64, the slide 44 to be moved from the storage compartment to the viewing station, and the down-turned ends 106, 106 of the upper slide retaining arms. As best shown in FIG. 5, the receptacle includes a front wall 111, a rear wall 112, and spaced side walls 113, 113. A pair of ledges 114, 114 extend inwardly from the lower edges of the side walls to support the slides 44 stacked in the receptacle. A pair of spaced slots 115, 115 are provided in the lower edge of the front receptacle wall 111 for permitting passage of the slide retaining fingers 64, 64 therethrough. The rear receptacle wall 112 is shorter than the front wall 111. The bottom edge of the rear wall cooperates with the ledges 114, 114 to define a transverse slot 116 through which a slide 44 and the slide engaging fingers 64, 64 may pass. The upper edge of the rear wall 112 is provided with spaced slots 117, 117 and the upper edge of the front wall 111 is beveled at 118, 118 to accommodate the down-turned forward edges 106, 106 of the upper slide retaining arms 104, 104.

The front end wall 30 of the housing 22 is removable to permit insertion and removal of a loaded slide receptacle 46. For this purpose, a latching mechanism 120 is provided in the front end wall 30. The latching mechanism comprises a latching bar 122 mounted on a stub shaft 124 which, in turn, is rotatably mounted in an aperture 126 in the wall 30. The outer end of the shaft 124 extends outside the front wall 30 and has a knob 128 mounted thereon for rotating the shaft and latching bar. As best shown in FIG. 4, the outer ends 130, 130 of the latching bar 122 are tapered and extend into slots 132, 132 in the forward ends of the outer side walls 32, 32 of the housing. When the latching bar 122 is rotated to a substantially horizontal position, the ends 130, 130 thereof extend into the slots 132, 132 to hold the wall 30 in place. When the latching bar 122 is rotated out of the horizontal position, the ends of the bar will clear the slots 132, 132 to permit removal of the wall and insertion or removal of a slide receptacle 46.

A magnifying lens 136 is provided in the upper housing wall 26, and cooperating lamp mounting ledges 138, 138, in substantial alignment with the lens 136, are provided in the bottom housing wall 24 to facilitate the viewing of slides 44 in the viewing chamber 40.

OPERATION OF SLIDE VIEWER AND CHANGER

In operation, the front end wall 30 of the housing 22 is removed by rotating the knob 128, and a slide receptacle 46 containing a stack 43 of slides 44 to be viewed is inserted into the slide storage compartment 38 against the partitions 36, 36. The front end wall 30 is then replaced and latched in position by rotating the knob 128 to position the ends 130, 130 of the latching bar 122 into the slots 132, 132.

To move a slide 44 from the stack 43 into the viewing chamber 40, the slide plate 62 is operated by pushing the handle 66 forwardly (toward the left in FIGS. 2, 3, 4 and 6). As the slide plate moves forwardly, the slide engaging fingers 64, 64 on the forward end thereof will pass through the transverse slot 116 in the slide receptacle 46 and cam the stack of slides 44 upwardly (FIG. 6) so that the slide plate 62 may be moved to the forward end of the housing (FIG. 2).

The slide plate 62 is then moved rearwardly (toward the right in FIGS. 2, 3, 4 and 6), whereupon the rear edges of the fingers 64, 64 will engage the lowermost slide 44 in the stack 43 and pull it rearwardly through the slot 116 in the bottom of the slide receptacle 46 and beneath the ramps 50, 50 (phantom line position of FIG. 3). As the slide is pulled rearwardly, it swings the lower ends 51, 51 of the ramps 50, 50 upwardly to permit passage of the slide therebeneath. When the slide reaches its rearwardmost position (FIGS. 3 and 4), it will be at the viewing station 41, in substantial alignment with the magnifying lines 136 and the lamp fixture mountings 138, 138, and may readily be viewed through the lens.

When it is desired to replace the slide 44 on top of the stack 43, the slide plate 62 is moved forwardly by pushing the handle 66, whereupon the pusher arms 86, 86 will push the slide up the ramps 50, 50 (FIGS. 2 and 6). As the pusher member 80 moves forwardly, the lower ledge 102 of the slide lifting device 100 will engage the lower rear surface of the slide, and the upper arms 104, 104 will overlie the upper slide surface to maintain the slide in a substantially horizontal attitude as it is being pushed up the ramps 50, 50. Slide retaining device 100 is cammed upwardly as the slide plate 62 is pushed forwardly by means of the guide slots 110, 110 which receive the outer ends 109, 109 of the transverse plate 108.

As the slide is pushed up the ramps 50, 50, the slide engaging fingers 64, 64 on the slide plate 62 are returned to their forward position (FIG. 2), whereby rearward movement of the slide plate 62 will again cause the fingers 64, 64 to engage the lowermost slide in the stack 43 and carry it to the slide viewing station 41. Thus, the slides 44 in the stack 43 may be repeatedly moved, in sequence, into viewing position by repeated forward and rearward movement of the slide plate 62.

While the slide viewer and changer 20 is provided with a viewing lens 136 and lamp mounting fixture 138 to permit the viewing of slides in the apparatus, it is contemplated, of course, that the principles of operation of the apparatus 20 may be incorporated into similar devices which may be used in conjunction with slide projectors.

MAGNETIC TAPE CARTRIDGE CHANGER

The magnetic tape cartridge changer 120 illustrated in FIGS. 8 – 11 is designed to move the lowermost cartridge 144 from a stack 143 of such cartridges in a cartridge storage chamber or compartment 138 to a playback station 141, and to thereafter replace the cartridge on top of the stack 143 by pushing it up a pair of ramps 150, 150. The changer 120 comprises a housing 122 having a bottom wall 124, a pair of spaced side walls 134, 134, and front end flanges 136, 136, 136. Partitions 137, 137 mounted on the inside surfaces of the side walls 134, 134 divide the housing 122 into the storage compartment 138 and a using or playback compartment 140 wherein station 141 is located.

Slideably mounted within the housing 122 is a cartridge changer mechanism comprising a slide plate 162, an upstanding pusher device 180, and a cartridge lifting mechanism 200.

The slide plate 162 is slideably retained on the bottom housing wall 124 by flanges 125, 125 mounted along the side edges of the bottom wall and spaced slightly thereabove. A pair of cartridge engaging fingers 164, 164 having cam surfaces 170, 170 along the forward edges thereof are provided at the forward end of the slide plate 162, and a handle 166 for moving the slide plate forwardly and rearwardly is connected to the bottom surface of the plate and extends through a longitudinal slot 167 in the bottom housing wall 124.

The pusher member 180 comprises an upstanding mounting plate 182 extending substantially perpendicular to the side walls and a brace plate 184 which extends substantially perpendicular to the mounting plate at the rear surface thereof. A pusher plate 186 is secured to the mounting plate 184 and is spaced slightly forwardly thereof to define a vertical slot 188.

The lifter mechanism 200 comprises a pair of lifting ledges 202, 202 adapted to engage the lower rear surface of the cartridge to be pushed up the ramps 150, 150. As best shown in FIG. 10, the lifting edges 202, 202 are the bottom arms of generally L-shaped members 203, 203 which are secured at their upper edges 205, 205 to a transversely extending slide bar 208. The slide bar 208 extends through the slot 188 between the mounting plate 184 and the pusher plate 186 for vertical sliding movement therein. The outer ends 209, 209 of the slide bar 208 have rollers 210, 210 mounted thereon for engaging the cam edges 212, 212 of the side walls 134, 134.

OPERATION OF THE CARTRIDGE CHANGER APPARATUS

In operation, a stack 143 of magnetic tape cartridges 144 to be played (or recorded on) is loaded into the storage compartment 138 through the open forward end of the housing 122.

When it is desired to move a cartridge 144 to the playback station 141, the slide plate 162 is pushed to its forwardmost position (FIGS. 8 and 9). The slide plate 162 is then moved rearwardly by means of handle 166, whereupon the fingers 164, 164 will engage the forward edge of the lowermost cartridge 144 in the stack and carry it beneath the lower ends 151, 151 of the ramps 150, 150 to the playback station 140. It will be noted that the upper ends of the ramps 150, 150 are hinged at 153, 153 to the upper ends of the partitions 136, 136 so that the lower ramp ends 151, 151 can swing upwardly (phantom line position in FIG. 9) to permit passage of cartridges 144 therebeneath.

The cartridge 144 at the playback station may then be played back or recorded on by a suitable player mechanism or recorder head (not shown) located at the rear of the apparatus 120.

When it is desired to replace the cartridge 144 on top of the stack 143, the slide plate 162 is moved forwardly by the handle 166, whereupon the pusher plate 186 will engage the rear edge of the cartridge and push it up the ramps 150, 150 (see FIG. 11). As the pusher plate 186 pushes the cartridge 144 up the ramps 150, 150, the rollers 210, 210 will ride up the cam edges 212, 212, thereby moving the lifter mechanism 200 upwardly. The lifter ledges 202, 202 engage the lower rear surface of the cartridge being replaced and carry it upwardly to maintain the cartridge in a generally horizontal attitude and thereby facilitate its replacement on top of the stack 143 (See FIG. 11). It is contemplated that the lifter mechanism 200 may be provided with an upper retaining arm (not shown) similar to the upper retaining arms 104, 104 of the lifter mechanism 100 of the slide changer mechanism shown in FIGS. 1 – 7 and described above.

As the slide plate 162 is moved forwardly to replace the cartridge 144 on top of the stack 143, the cartridge engaging fingers 164, 164 on the forward end thereof will be moved forwardly, camming the stack of cartridges 144 upwardly, until the fingers reach their forwardmost position (FIG. 9), whereupon they will be positioned to engage the next cartridge to be moved to the playback station.

From the foregoing it is apparent that the cartridge changer apparatus 120 depicted in FIGS. 8 – 11, like the slide viewer and changer 20 shown in FIGS. 1 – 7, may be employed to sequentially move cartridges 144 from the stack 143 to the playback station 140. It is, of course, contemplated that the cartridge changer apparatus 120 may be employed in a magnetic tape cartridge recorder or player (not shown) which may incorporate means for automatically moving the handle 166 to position the cartridges in the record or playback position.

I claim:

1. An improved cartridge storage and selector apparatus, comprising:
    a housing having a bottom wall and a pair of spaced side walls;
    partition means dividing the housing into a cartridge storage compartment and a cartridge using compartment;
    a ramp surface extending between the upper portion of said cartridge storage chamber and the lower portion of said cartridge using chamber; said ramp surface being pivotably mounted, whereby the lower end thereof may swing upwardly and permit the passage of a cartridge being moved from the storage compartment to the using compartment;
    a cartridge changer mechanism mounted within said housing; said changer mechanism comprising:
    a generally flat slide plate mounted within said housing on the bottom wall thereof;
    a cartridge engaging finger mounted on the forward end of said slide plate; said finger having a cammed forward surface;
    an upstanding pusher member mounted on said slide plate for pushing a cartridge from said using compartment, up said ramp surface and onto the top of a stack of cartridges in said storage compartment;

a lifting mechanism mounted in said pusher member for vertical sliding movement relative thereto; said lifting mechanism comprising a lifting ledge adapted to engage the rear edge portion of a cartridge being pushed up said ramps; and
    means defining cam edges on said side walls of said housing for urging said lifting mechanism upwardly as said pusher member is being moved forwardly to push a cartridge up said ramp surface.

2. An improved object storage and changer apparatus, comprising:
    a housing having means defining an object storage chamber for holding a stack of objects and an object using station adjacent the object storage chamber; said storage chamber including an upper portion;
    ramp means extending between said object storage chamber and said object using station; said ramp means being inclined downwardly from said upper portion of said storage chamber to said object using station; said ramp means comprising a ramp surface pivotably mounted in said housing to permit the passage of an object therebeneath; and
    an object changer mechanism for moving an object from one end of the stack in the object storage chamber to the object using station, and thereafter replacing the removed object at the other end of the stack in the object storage chamber by pushing the object along said ramp means.

* * * * *